United States Patent Office 3,236,788
Patented Feb. 22, 1966

3,236,788
PROCESS OF FORMING POROUS THERMO-
PLASTIC STRUCTURES AND FILMS
Robert Smith-Johannsen, Glens Falls, N.Y., assignor to S-J Chemical Company, Nishayuna, N.Y., a co-partnership
No Drawing. Continuation of application Ser. No. 640,314, Feb. 15, 1957. This application July 3, 1961, Ser. No. 121,312
6 Claims. (260—2.5)

This invention relates to a new process for producing plastic or resinous compositions capable of being formed into porous structures and films and to the process of producing the porous plastic compositions and films. More particularly, the invention relates to the production of porous plastic compositions and films by freezing a freeze-sensitive aqueous dispersion of resin particles under controlled conditions to form a frozen mass, thawing the frozen mass, and breaking down the thawed mass. The broken-down mass can then be formed into the desired structure or applied to any suitable base as a film, and the formed structure or film subjected to a temperature sufficient to fuse the resin present in the original resinous dispersion whereby a fused porous structure or film is produced. The invention also includes the compositions capable of being formed into porous structures themselves as well as the resulting fused porous plastic compositions and films.

The porous structures produced according to this invention can be microporous or macroporous and are useful wherever porosity is desired such as in fabrics for wearing apparel, upholstery, and the like, filters, battery separators, ion exchange, etc.

The invention broadly involves the freezing of a freeze-sensitive resin dispersion or latex in a controlled manner to form a frozen mass. The frozen mass is thawed, resulting in the formation of a resinous mass which is generally sponge-like or rubbery. The thawed mass is stable and advantageously still contains a small amount of water. This thawed mass can be stored in sealed containers to prevent significant loss of water. The thawed mass is then broken down by suitable means such as by grinding or passing it through differential rolls of a conventional two-roll rubber mill, or the mass can be broken down by dispersing it in a large amount of water in a Waring blender. When the thawed coagulated mass is broken down it forms into a moldable or coatable composition. The resulting composition may be paste-like, suitable for molding or calendering, or it may be of a thinner consistency depending upon the amount of water in the mixture suitable for application to a surface by various other well-known means. The compositions can then be formed into the desired shape or coated onto the desired backing materials and heated to a temperature sufficient to remove the water or dispersing medium by evaporation and then to effect a fusion of the resinous structure. This fusion of the resin particles binds the resin particles together into a solid porous structure.

Various resin or plastic compositions can be used to form the coating compositions of this invention provided they are capable of being formed into freeze-sensitive dispersions and are also capable of being fused when heated. The resin or plastic used can thus be a thermoplastic resin or it may be thermoplastic during the processing and assume a permanent set or become thermosetting after it has been heated and fused. It is advantageous to use the dispersions which are capable of drying down into a continuous film. The dispersing phase should be a liquid capable of being frozen and the common aqueous resin dispersions are most advantageous according to this invention.

Freeze-sensitive resin dispersions or emulsions are well known. The freeze-sensitivity of many of the resin dispersions or emulsions has for some time been considered to be disadvantageous since upon freezing the dispersions, the dispersed resin particles precipitate and they cannot for all practical purposes be redispersed. Freezing of such dispersions has been considered to render them worthless for the uses for which they are intended. By freeze-sensitive resin dispersions, I mean a dispersion which when the aqueous phase is frozen the resin particles are precipitated or coagulated by the freezing and cannot, for all practical purposes, be readily redispersed.

Various resin, plastic, or rubber compositions can be formed into freeze-sensitive dispersions and used according to this invention including vinyl polymers, such as polyvinyl acetate, polyvinyl chloride, polyvinyl acetal, polyvinylidene chloride, and the like; acrylic polymers, such as polyacrylic acid, polymethacrylic acid, polymethacrylate, polymethylmethacrylate, polyacrylonitrile, and the like. Further examples include polystyrene and derivatives of polystyrene, such as sulphonated polystyrene; polyethylene and derivatives of polyethylene, such as polyethylene terephthalate, and the like. Still further examples include synthetic rubbers such as polymerized butadiene and neoprene, and such as polymerized chloroprene.

Plasticized resin dispersions or latices can also be used such as dibutyl phthalate plasticized polyvinyl chloride and polyacrylonitrile plasticized vinyl chloride.

Copolymers and terpolymers forming freeze-sensitive aqueous dispersions and which are capable of being fused when heated can also be used according to this invention. Some examples of copolymers which can be used include butadiene-styrene copolymers, vinyl acetate-vinyl stearate copolymers, and the like.

The invention also includes the formation of compositions capable of being formed into porous structures and films incorporating mixed dispersions or emulsions which are freeze-sensitive and which are capable of being fused upon heating. The process according to this invention is not dependent upon chemical compatibility of the various resins utilized to form the compositions and porous structures and films, and it is therefore a part of this invention that one or more incompatible resin dispersions can be intermixed and processed according to this invention to form films having novel characteristics not heretofore obtainable. An example of normally incompatible resins which can be used according to this invention and formed into compositions and porous structures and films include neoprene (polychloroprene) and vinyl chloride.

Other resins can also be used to form the porous structures according to this invention in addition to those specifically set forth above so long as they meet the requirements herein set forth as will be apparent to those skilled in the art.

The resin dispersions can be frozen according to this invention in various manners so long as the freezing is controlled so as to result in the production of porous structures or films after the frozen mass has been thawed, broken down, dried, and heated as described herein.

The physical phenomenon which takes place during the steps of freezing, thawing, and breaking down of the resin dispersions to produce the compositions according to this invention is not completely understood. During the process of controlled freezing, however, the small resin particles are forced into physical contact with each other by the expanded ice structure formed. The physical structure of the resin formed corresponds to the formation of the ice crystals and thus the type and number of ice crystals formed mainly determine the structural form of the resin particles. Under the controlled freezing the small resin particles are most advantageously formed into numerous needlelike or threadlike structures. Most of these threadlike structures are also physically forced into contact with each other at one or more points forming a sort of crossed-linked structure. These threadlike structures are generally made up of a series of resin particles connected together more or less end-to-end by physical means and which particles substantially maintain their original identity.

Due to the many variables involved such as the rate of freezing, the freezing temperature, the freezing surface, as well as the particular resin dispersion being frozen, it is not possible to set forth specific or definite freezing data or limitations. In actual practice of the invention, the particular and most advantageous freezing conditions for any particular resin dispersion or emulsion can be determined by routine experimentation.

With respect to the freezing step involved in the present invention, it can, however, be generally stated that the resin or rubber dispersions should not be frozen too slowly. If the dispersions are frozen too slowly, relatively large ice crystals are formed resulting in coarse aggregates of resin, and the resulting frozen mass, when thawed and broken down according to this invention, results in a cornmeal-like substance which is very difficult to control or work with to form the porous structures and films of this invention and at times cannot be formed into porous structures or films at all.

Furthermore, depending upon the amount and kind of soluble material which is in the water or in the dispersing phase, the temperature at which a sufficiently large volume of ice can be formed to force the resin particles into physical contact may vary considerably.

I have found that it is advantageous to freeze the dispersions very rapidly or almost instantaneously. In this manner a more or less microcrystalline ice structure is formed within the dispersion causing a coagulation or precipitation of the resin or rubber particles and the forcing together of the individual resin or rubber particles in an advantageous manner.

The controlled freezing conditions under which the dispersions can be frozen according to this invention are dependent to a great extent upon the particular resin dispersion being frozen and the particular surface upon which it is frozen.

Aqueous resin dispersions of the above-mentioned materials, as well as others coming within the scope of this invention, are well known and can either be purchased on the market or prepared by well-known processes having a great variety of properties. These variations in the properties of the various resin dispersions affect the freezing conditions as well as other process steps as is hereinafter disclosed.

I have found that most resin dispersions can be frozen according to this invention by subjecting them to a temperature and under other conditions to effect an almost instantaneous freezing throughout the thickness of the dispersion. For example, I have found that most resin dispersions can be frozen by pouring them onto a flat metal plate and cooling them to a temperature of about 20° C. below the freezing temperature of the dispersion to a thickness of between about ⅛ of an inch to ¹⁄₁₆ of an inch. This results in an almost instantaneous freezing of the dispersion.

Some of the properties of the resin dispersions which affect the freezing conditions desirable include the freezing point of the dispersion vehicle, the thickness in size of the dispersion being frozen, the total solids content of the dispersion, the presence of, amount, and relative effectiveness of the various additives such as plasticizers, pigments, stabilizers, fillers, thickeners, wetting agents, protective colloids, alkali, and the like.

The discussion below relating to the effects of the various properties of the resin dispersions on the freezing conditions is by necessity of a general nature since what may hold true for one property such as the presence of wetting agents may be offset or entirely reversed because of another property such as the solids content of the dispersion. Thus the most advantageous freezing conditions for a particular dispersion must be determined by routine experimentation.

As stated above, the resin dispersions can generally be frozen at a temperature well below the freezing point of the dispersion, and I have found that a freezing temperature of about 20° C. below the freezing point is advantageous. Still lower or higher temperatures can, of course, be used if desired so long as the results desired as herein described are obtained.

The freezing conditions and temperatures are also varied by the dimensions of the dispersion being frozen. Generally as the thickness in size is increased, it will be advantageous to use lower freezing temperatures or different methods of freezing. By thickness of the dispersion, I mean that difference between or from the freezing surface. For example, when a dispersion is poured onto a cold plate, that portion of the dispersion closer to the plate freezes first, while that farthest from the freezing medium freezes last. As the thickness of the dispersion is increased, it takes longer and longer for that portion farthest away from the freezing medium to freeze. If the dispersion frozen is too thick under the freezing conditions used, it freezes too slowly on the outside and large crystals will be formed rendering at least that portion of the frozen cake undesirable or useless. I have found that if the resin dispersions are frozen on a cold plate in a thickness of between about ⅛ and ¹⁄₁₆ of an inch at about 20° C. below the freezing point, an advantageous frozen cake is generally obtained. The thickness which can be advantageously frozen can, of course, be varied in either direction depending largely upon the temperature used and the particular resin dispersion being frozen. The heat conductivity of the resin itself as well as the effects of the many possible additives which can be used and the solids content thereof will all effect the thickness which can be frozen under otherwise identical freezing conditions. If the manner of freezing were changed so as to introduce a series of freezing plates into a bulk dispersion, the same principle would apply with respect to the speed or rate of freezing.

A dispersion containing a lower solids content should generally be frozen faster and at a lower temperature than a resin dispersion containing a higher solids content. The solids content should be sufficiently high so that there are enough resin particles present to be forced into contact with each other to form a structure. I have frozen resin dispersions having a solids content between 38 to 56 percent. Dispersions of lower or higher solids content can also be used however.

The presence of wetting agents, emulsifying agents, and/or dispersing agents will also effect the freezing conditions. Generally as the amounts of these agents are increased, the dispersions should be frozen faster and at lower temperatures; and also as the effectiveness of these agents is increased, the dispersions should also be frozen faster and at lower temperatures.

As noted above there are a vast number of different agents or additives which can be and are added to resin dispersions or emulsions, and the effect of these agents under freezing conditions will be quite variable as will be understood by those skilled in the art. Some agents may require lower temperatures, a faster rate of freeze, and so forth. The most advantageous freezing conditions must then be determined for each particular dispersion bearing in mind that it is most advantageous to form small, microcrystalline, substantially uniform ice crystals so as to result in the formation of threadlike plastic structures in the frozen mass.

I have also found that the particular surface upon which the resin dispersions are frozen has a profound influence on the type of product formed and its control is of importance to the quality of the final product. I have found that it is advantageous to freeze the resin dispersion on a surface which is highly nucleated. Freezing the resin dispersions on a surface which has formed thereon few freezing nuclei results in the formation of relatively large ice crystals even when frozen at low temperatures and at a rapid rate.

The surfaces upon which the resin dispersions are to be frozen can be nucleated in various manners. Examples of methods of nucleating the freezing surface include merely wiping the surface with a suitable cloth, such as a cotton or wool cloth, and the formation of a silver iodide or silicone coating on the freezing surface.

A silver iodide coating can be applied to the freezing surface by well-known methods such as by first placing a very thin layer of silver over the surface and then contacting the surface with iodine vapors. To contact the surface with iodine vapors to form the silver iodide coating, it is only necessary to open the bottle of iodine in the same room or somewhere near the silver coating, and the silver iodide layer will very rapidly form on the freezing surface. The silver iodide crystals or nuclei form a foci for the ice crystals and significantly aid in the nucleation of freezing and more readily permit the formation of micro-crystals of ice and the formation of the threadlike resin structures.

I have found that by far the most advantageous surface for freezing the resin dispersions according to this invention is a silicone or silicone-treated surface. The type and amount of needlelike or threadlike resin structures formed by freezing the resin dispersions on a silicone surface are most advantageous. The resulting broken-down pastes formed by freezing the resin dispersions on a silicone surface are greatly superior to those pastes formed from the resin dispersions frozen on any other type of surface I have tried.

The silicone surface may be a silicone resin or silicone rubber surface. Various silicone resins and rubbers well known in the art can be used as the silicone freezing surface such as polydimethyl siloxane and partially phenyl substituted polydimethyl siloxane resins and rubbers. The freezing surface can also be a silicone-treated surface. The surface can be treated by applying a suitable silicone oil to the surface in a thin film. Films of silicone oil can be applied most readily by wiping the surface with a cloth having the silicone oil incorporated therein. Various well-known silicone oils can be used for this purpose, and I have found that polydimethyl siloxane oils or partially phenyl substituted derivatives thereof are most advantageous. A silicone oil treated surface is superior to the silicone resin or rubber surface since the silicone oils are more pure and uncontaminated by curing agents, etc. The freezing of the resin dispersions on a silicone or silicone-treated surface more readily results in the formation of the needle-like or threadlike resinous structures. The ice crystals further form perpendicular to the freezing surface as well as parallel thereto when utilizing a silicone or silicone-treated surface.

To freeze the dispersions they may be poured into molds of suitable sizes or poured on a flat plate. When the dispersions are frozen in a mold they conform to the shape of the mold and when frozen by pouring them onto a flat plate they are frozen in the form of a pancake.

One manner of freezing the dispersions is to cool a flat metal plate to a temperature of about 20° C. below the freezing point of the dispersion being frozen, or other desirable temperature, and to pour thereon a pancake of the resin dispersion. In this manner the resin dispersion is frozen almost instantaneously. The plate can be cooled in any manner desired such as in a deep freeze or by circulating cooling liquid contained in pipes within the plate.

When freezing the resinous dispersion on a plate, I have found that it is advantageous to use a very thin, hard, stainless steel, flexible plate. After the resin dispersions have been frozen on such a very thin, flexible, steel plate or sheet, they can be removed therefrom merely by tapping the steel plate which loosens the frozen mass from its freezing surface.

Another manner of freezing the resin dispersions of this invention involves the placing of a refrigerant substance inside of a cylinder. Refrigerant substances which can be used include Dry Ice and acetone, liquid air, and freon gas. In freezing the dispersion in this manner the cylinder can be partially submerged in the aqueous dispersion and rotated. As the cylinder rotates within the aqueous dispersion, it freezes a thin layer of the dispersion on the outer surface of the cylinder. The speed of rotation of the cylinder will determine the thickness of the layer frozen on the surface of the cylinder.

The resin dispersions of this invention can also be frozen by dipping a cold metal plate or object into the dispersions. In freezing the dispersions in this manner, it is only necessary to dip the cold plate or object into the dispersion and remove it in a matter of a few seconds. In this manner a slow freeze of the dispersion farthest away from the cold plate is avoided. The frozen dispersion sticks to the cold plate when it is withdrawn and only that which has been frozen within a few seconds is withdrawn.

When the resin dispersions are first frozen, such as by pouring the resin dispersion on a cold, thin, hard, stainless steel plate cooled to 20° C. below the freezing point of the dispersion, the frozen cake is almost instantaneously frozen and quickly reaches the freezing temperature of the dispersion. The freezing temperature of most aqueous resin dispersions is about 0° C. and immediately after the dispersion is frozen the resulting cakes are generally at 0° C. or thereabouts and are not yet down to the lower temperature chosen as the freezing temperature. After the resin dispersion has been frozen in this manner, it is important to maintain the frozen cake at the temperature below the freezing point of the resin dispersion to bring the temperature of the frozen cake down to approximately the temperature of the freezing surface. The frozen cake can be permitted to remain on the plate and stored or it can be removed from the plate and stored at the chosen freezing temperature (e.g. 20° C. below the freezing point) of the dispersion. The storage time at this temperature should be sufficient to permit substantially complete growth of the ice crystals and the complete formation of the threadlike or needlelike resinous structures. The storage period at this temperature may vary from about 30 minutes to several hours depending on the particular dispersion employed. The particular time at which the frozen cake is maintained at the freezing temperature to produce the most advantageous porous articles can best be determined by routine experimentation.

The frozen resin cakes or masses can be thawed by permitting them to stand at temperatures above freezing for a sufficient time to bring the temperature of the frozen cake above its freezing temperature. Infra-red heat should be avoided in thawing the frozen structures. If the frozen structures are subjected to infra-red rays by an infra-red light or in sunlight, the frozen structures do not generally hold their shape after they have thawed. It is very important that the frozen resin cakes are not disturbed during the thawing process. By disturbing the frozen resin cakes during the thawing, I mean agitation of various sorts such as dropping the cakes from the end of a transporting belt into a container, excessive vibration, and the like. For example, if the frozen cake, after it has been stored and cooled to the freezing temperature employed, is taken and thawed with agitation such as by rubbing it between the hands, the structure breaks down and re-disperses in the dispersion media and can no longer be used to form the porous structures of this invention. The frozen cakes can withstand a limited amount of disturbance during thawing and still maintain the sponge-like, rubbery structure after the thawing has been completed but should be avoided as much as possible.

When the frozen dispersions are thawed, some or most of the water resulting can be drained therefrom and the resin structure formed during the freezing is maintained. The resulting thawed mass is generally rubbery and sponge-like.

The viscosity of the resulting paste formed after the thawed structure has been broken down can be controlled at the thawing or washing stage if desired. Water can be removed from or added to the thawed mass before it is washed. The amount of water permitted to remain in the thawed structure after washing can also be used to control the final viscosity of the paste or broken-down composition.

After the mass has been thawed, the resulting thawed, expanded, and coagulated structure can be washed and drained with the resulting removal of any desired amount of wetting and dispersing agents originally present in the latex or suspension. The amount of wetting and dispersing agents removed will depend upon the extent of washing and draining.

I have found that the porosity of the resulting fused structures and films can be controlled to a great extent by controlling the amount and type of wetting and dispersing agents in the paste after it has been thawed. The amounts and types of wetting and dispersing agents can be controlled in the original latex before it is frozen and also by removal of any desired amount of wetting or dispersing agents after the structure has been thawed by controlled washing. It is not possible to set forth any definite limits regarding the amount or effectiveness of particular wetting or dispersing agents to obtain a desired porosity because of the vast number of different wetting and dispersing agents which can be used and which also differ in their effectiveness. It can generally be stated, however, that as the amount or effectiveness of the wetting or dispersing agents is decreased, the resulting porosity will also be correspondingly decreased and vice versa.

If it is desired to decrease or increase the porosity which would normally result, wetting or emulsifying agents can be added at any stage of the process or removed from the thawed structure prior to coating, drying, and fusing of the resin.

The broken-down paste can also be dispersed in a large volume of water and by combining it with fibers, such as cellulosic and glass fibers, it can be deposited as a porous resin paper on a screen by conventional paper-making processes. The broken-down paste, for example, can be added to the beater and otherwise processed as paper. The paper is dried and heated to fusion to complete the process.

Virgin latices or dispersions can also be added to the broken-down paste material in amounts up to between about 5 and 10 percent to modify the properties of the resulting porous film. For example, the addition of more of a virgin polyvinyl chloride latex to a plasticized polyvinyl chloride broken-down paste will contribute considerably to the adhesion of the fused film to a backing material and will not significantly effect the porosity of the porous film or structure.

The rubbery and sponge-like thawed mass can be broken down by various means such as by grinding or shearing action. An example of a method of breaking down the thawed rubbery-like mass is to continuously knead it between the rolls of a conventional two-roll rubber mill having a wide spacing and driven at differential speeds. This manner of breaking down the thawed rubbery-like masses imparts a shearing action thereto. I have also found that the sponge-like, rubbery, thawed masses can be broken down by placing the same in a Waring blender together with a high percentage of water. About 95–98 percent water is advantageous.

The breaking down of the thawed structure does not cause a substantial densification but merely appears to break up the threadlike structures into smaller ones and forms together with water a coatable or moldable paste composition. The consistency of the resulting broken-down composition can be controlled largely by the amount of water permitted to remain in the thawed mass prior to breaking it down or added thereto during the process. The additional pressure originally involved in molding or calendering the broken-down mass does not effect any significant or substantial densification.

The compositions of this invention can be fused by first driving out the water or dispersing medium with heat and then heating them to the fusion temperature of the particular resin making up the composition. The heating should not be done at temperatures or for a length of time which will cause any significant densification thereof. I have found that most resinous compositions produced according to this invention can be fused at temperatures far in excess of their recommended fusion temperatures for short periods of time to effect the fusion. This is advantageous since it makes possible flash fusion techniques and reduces the processing time. For example, the recommended fusion temperature of a plasticized polyvinyl chloride is 140° F., and I have found that compositions formed of polyvinyl chloride according to my invention can be fused into porous structures by subjecting the same to temperatures of about 250° F. for from a few seconds to about a minute. The use of such high temperatures does not significantly affect the porosity of the resulting films.

The compositions of this invention capable of being formed into porous structures and films can be applied to various backing materials so long as the particular resin is capable of adhering thereto and is capable of withstanding the temperatures necessary to fuse the resin particles. If the entire structure is to be porous, then the backing material must also be porous, and preferably at least as porous as the resinous composition adhered thereto. I have found that it is advantageous to apply the compositions of this invention to woven or porous non-woven fabrics. Examples of backings to which the compositions of this invention can be applied and adhered include paper, leather, and fabrics of all sorts such as cotton, sateen, nylon, and glass.

Additives can also be added to the compositions of this invention and also to the resin dispersions during various steps of the process. The additives are generally used to impart color or other desirable properties to the resulting porous structures and films. For example, I can add plasticizers or pigments to the dispersions before they are frozen or to the thawed structure before, during, or after they are broken down. I can also add fibrous materials thereto such as paper, asbestos, paper pulp, etc. When adding such inert fibrous material it is advantageous to add it during the breaking down of the thawed mass or after it has been broken down. Other materials can also be similarly added to impart to the fused porous structures the properties desired so long as they do not interfere with the formation of the desired porous structures or films.

*Example 1.*—A ½ inch thick aluminum plate was cooled to 0° F. in a freezer and wiped with a polydimethyl siloxane oil. A plasticized vinyl chloride latex or resin dispersion marketed under the trade name Geon 577 by the B. F. Goodrich Chemical Company was then poured onto the cooled aluminum plate. Since freezing commenced instantaneously a "pancake" was formed and a sufficient amount of the vinyl chloride latex was poured onto the cooled plate to form a pancake about 3/16 of an inch thick and 8 inches in diameter. The surface was wiped with a polydimethyl siloxane oil contaminated cloth immediately before the vinyl chloride latex was poured thereon to insure a high degree of surface nucleation during the freezing. The vinyl chloride pancake was permitted to remain on the cooled plate for 1 minute after which time it was completely frozen. The vinyl chloride pancake was then peeled off the surface and stored at 0° F. for 1 hour.

The frozen vinyl chloride pancake was then removed from the freeze storage and placed on absorbent toweling and allowed to thaw naturally without disturbing it at room temperature. When the pancake had warmed to room temperature it had the texture and appearance of a wet, soft rubber sponge.

A sufficient number of pancakes were formed and thawed as described above to produce 10 pounds of the thawed rubber sponge-like polyvinyl chloride.

The 10 pounds of polyvinyl chloride was then placed in a Waring blender with an excess of water so that the resin content was about 5 percent by weight. The vinyl chloride resin-water mixture was then mixed in the Waring blender for about 1½ minutes after which time the resin was thoroughly dispersed throughout the water in the form of fine resin fibers resembling ground wood.

The water slurry of resin fibers was then mixed with 30 percent by weight (dry weight basis) of cellulose fibers which had been previously processed in a paper beater. The combined slurry was then filtered out on a metal screen, dried, and compressed in a calender in the manner commonly used in making paper. The resulting vinyl chloride-cellulose fiber paperlike structure was then dried for 3 minutes in an oven at 110° C. and then fused at 150° C. for 1½ minutes.

The resulting polyvinyl chloride-cellulosic sheet was uniformly porous. The pores were quite large and the sheet could be considered to be macroporous.

Geon 577 is a resin dispersion of polyvinyl chloride plasticized with about 20 parts of an alkyl aryl phosphate and containing approximately 55 percent solids. The resin particles in the latex average about 0.2 micron in diameter, are negatively charged, and have an optimum fusion temperature of about 240° F. The pH of the Geon 577 latex is 8.5.

*Example 2.*—A polyvinyl chloride latex marketed under the trade name Geon Hycar 552 by the B. F. Goodrich Chemical Company was frozen and thawed in the identical manner as set forth in Example 1. A sufficient number of pancakes was formed to result in the production of 5 pounds of the rubber sponge-like polyvinyl chloride. Geon Hycar 552 is a polyvinyl chloride latex plasticized with butadieneacrylonitrile rubber containing about 52 percent solids and having a pH of 8.5. The optimum fusion temperature of the resin is 300° F.

The rubber sponge-like thawed polyvinyl chloride pancakes were then mixed with 10 parts by weight titanium dioxide pigment and 20 parts by weight calcium carbonate filler on a solids basis.

This mixture was then kneaded between two rolls of a conventional rubber mill set at a wide nip. The rolls were operated slowly and at differential speeds to impart a sheering action to the thawed rubber sponge-like polyvinyl chloride to break down the thawed structure. The kneading of the mixture was continued until it had a smooth consistency resembling cream cheese.

The broken-down, pastelike composition was then coated on a cotton cloth backing by the conventional knife coating technique commonly used for coating cloth with vinyl plastisols. The composition was spread on the cloth in a uniform thickness of 0.020 inch. The cloth and coating was then heated to 220° F. to drive out the water and fused at 325° F. for 1 minute.

The resulting film was porous and showed a porosity of 150 seconds as measured on a Gurley densometer. Drops of water applied to the coating were also observed to soak through the film.

*Example 3.*—A polyvinyl chloride latex plasticized with butadiene-acrylonitrile rubber marketed under the trade name Geon Hycar 552 was frozen and thawed in the identical manner as described in Example 2. A sufficient number of pancakes was formed to result in the production of 5 pounds of the thawed rubber sponge-like polyvinyl chloride resin.

The 5 pounds of the thawed rubber sponge-like polyvinyl chloride was then mixed with 10 parts by weight titanium dioxide pigment, 20 parts by weight calcium carbonate, and 10 parts by weight of the original virgin Geon Hycar 552 latex. The parts by weight referred to are on a solids basis.

This mixture was then broken down, applied to the cotton cloth backing, dried, and fused in the identical manner as set forth in Example 2.

The resulting film was porous as determined by the fact that a drop of water could be observed to soak through the film. The addition of the virgin latex improved the adhesion of the composition to the cotton cloth but did not significantly effect the porosity of the film.

*Example 4.*—A porous polyvinyl chloride (Geon Hycar 552) resin film was formed in the identical manner as set forth in Example 2 with the exception that the 10 parts by weight titanium dioxide and the 20 parts by weight calcium carbonate were mixed into the polyvinyl chloride latex before it was frozen. The resulting paste or broken-down composition was somewhat softer and easier to coat.

*Example 5.*—A medium acrylonitrile rubber marketed under the trade name Hycar 1577 by the B. F. Goodrich Chemical Company and containing 20 parts by weight titanium dioxide was frozen and thawed in the identical manner as the polyvinyl chloride resin latex of Example 1. This mixture was broken down on a differential two-roll rubber belt as described in Example 2. The broken-down composition or paste was then dispersed in an excess of water so that the resin content was about 5 percent. 40 percent by weight on a solids basis of cellulose fibers from a paper beater was then mixed together with the resin-water dispersion.

The cellulose-resin dispersion was then formed into sheets by conventional paper making technique, dried, and fused at 300° F. for 1 minute. The resulting sheets were approximately ⅓₂ of an inch thick and could be creased without cracking. The porosity as determined by the Gurley densometer was 150 seconds.

The Hycar 1577 used in the above example had a resin particle size of about 400 angstroms, a pH of 10, and contained 38 percent solids.

Compositions or pastes were also formed by freezing, thawing, and breaking down in the identical manner as set forth in Example 5 from a vinyl acetate latex marketed under the trade name Vinac WR–20 by the Colton Chemical Company, an acrylonitrile resin dispersion marketed under the trade name Hycar 1852 by the B. F. Goodrich Chemical Company, and a polymerized 2-chlorobutadiene-1,3 resin dispersion marketed under the trade name neoprene by E. I. du Pont de Nemours and Company.

The above examples all show the use of a silicone freezing surface. In addition to the advantages of the silicone surface, as discussed above, the silicone surface also facilitates removal of the frozen bodies therefrom. The invention can be practised by utilizing other surfaces which are preferably nucleated such as aluminum, copper, sheet steel, and so forth.

This application is a continuation of my prior application, Serial No. 640,314, filed February 15, 1957, now abandoned.

I claim:

1. The process of forming porous thermoplastic structures and films which comprises freezing a thin film of an aqueous dispersion of film-forming, freeze coagulable, resinous thermoplastic vinyl particles at a temperature below the freezing point of the dispersion on a silicone surface provided with freezing nuclei, maintaining the frozen dispersion at its freezing temperature until the frozen dispersion has reached its freezing temperature, thawing the frozen dispersion to form a porous coagulate of thread-like structures and subjecting the thawed coagulate to a shearing action sufficient to form a liquid dispersion of the thawed coagulate.

2. The process of forming porous thermoplastic structures and films which comprises freezing a thin film of an aqueous dispersion of film-forming, freeze coagulable, resinous thermoplastic vinyl particles at a temperature below the freezing point of the dispersion on a silicone surface provided with freezing nuclei selected from the group consisting of a polydimethylsiloxane and a partially phenyl-substituted polydimethylsiloxane to form the thermoplastic particles into threadlike structures oriented both perpendicular and parallel to said silicone surface, maintaining the frozen dispersion at its freezing temperature until the frozen dispersion has reached its freezing temperature, thawing the frozen dispersion to form a porous coagulate of thread-like structures and subjecting the thawed coagulate to a shearing action sufficient to form a liquid dispersion of the thawed coagulate.

3. The process of claim 2 in which the silicone surface is a siloxane oil.

4. The process of forming porous thermoplastic structures and films which comprises freezing a thin film of an aqueous dispersion of film-forming, freeze coagulable, resinous thermoplastic vinyl particles at a temperature below the freezing point of the dispersion on a silicone surface provided with freezing nuclei selected from the group consisting of a polydimethylsiloxane and a partially phenyl-substituted polydimethylsiloxane to form the thermoplastic particles into thread-like structures oriented both perpendicular and parallel to said silicone surface, maintaining the frozen dispersion at its freezing temperature until the frozen dispersion has reached its freezing temperature, thawing the frozen dispersion to form a porous coagulate of thread-like structures, subjecting the thawed coagulate to a shearing action sufficient to form a liquid dispersion of the thawed coagulate, forming the liquid dispersion into the desired shape, and heating the formed shape to a temperature sufficient to fuse the resin particles to form a porous structure.

5. The process of claim 4 in which the silicone surface is a siloxane oil.

6. The process of claim 4 in which the liquid dispersion is coated on a porous base and heated thereon to a temperature sufficient to fuse the thread-like resin structures to each other and to said base to form a porous article.

References Cited by the Examiner

UNITED STATES PATENTS

| | | | |
|---|---|---|---|
| 1,874,546 | 8/1932 | Konrad | 260—94.7 |
| 2,187,146 | 1/1940 | Calcott et al. | 264—28 |
| 2,426,127 | 4/1947 | Thomas et al. | 260—23.7 |
| 2,525,272 | 10/1950 | Rhoton | 161—227 |
| 2,811,408 | 10/1957 | Braley | 264—338 |

FOREIGN PATENTS 304,207    4/1930    Great Britain.

MURRAY TILLMAN, *Primary Examiner.*

LEON J. BERCOVITZ, *Examiner.*